US008191162B1

United States Patent
Shukla et al.

(10) Patent No.: US 8,191,162 B1
(45) Date of Patent: May 29, 2012

(54) SYSTEM AND METHOD FOR SECURING AND TRACKING FILES

(75) Inventors: Amitabh Shukla, San Jose, CA (US);
Sandeep Tiwari, Los Gatos, CA (US)

(73) Assignee: Zafesoft Inc., Los Gatos, CA (US)

( * ) Notice: Subject to any disclaimer, the term of this patent is extended or adjusted under 35 U.S.C. 154(b) by 810 days.

(21) Appl. No.: 11/784,923

(22) Filed: Apr. 10, 2007

(51) Int. Cl.
*G06F 21/00* (2006.01)

(52) U.S. Cl. .......................................... 726/28; 713/165
(58) Field of Classification Search .................. 713/165; 726/28
See application file for complete search history.

(56) References Cited

U.S. PATENT DOCUMENTS

| 5,390,318 | A  | * | 2/1995 | Ramakrishnan et al. ...... 711/158 |
| 6,185,681 | B1 | * | 2/2001 | Zizzi .............................. 713/165 |
| 6,505,244 | B1 | * | 1/2003 | Natarajan et al. ............. 709/223 |
| 7,707,642 | B1 | * | 4/2010 | Herbach et al. ................. 726/27 |
| 2004/0107342 | A1 | * | 6/2004 | Pham et al. .................... 713/165 |

* cited by examiner

*Primary Examiner* — Gilberto Barron, Jr.
*Assistant Examiner* — Cordelia Zecher

(57) ABSTRACT

A method, system and computer program product for securing and tracking restricted files stored in a data processing system is provided. The data processing system is connected to a server for sharing information. An entity requesting to access a restricted file is authenticated, based on certain policies defined by a system administrator. Further, the system maintains a log of operations executed on the restricted file, and sends a record of the log to the server.

13 Claims, 7 Drawing Sheets

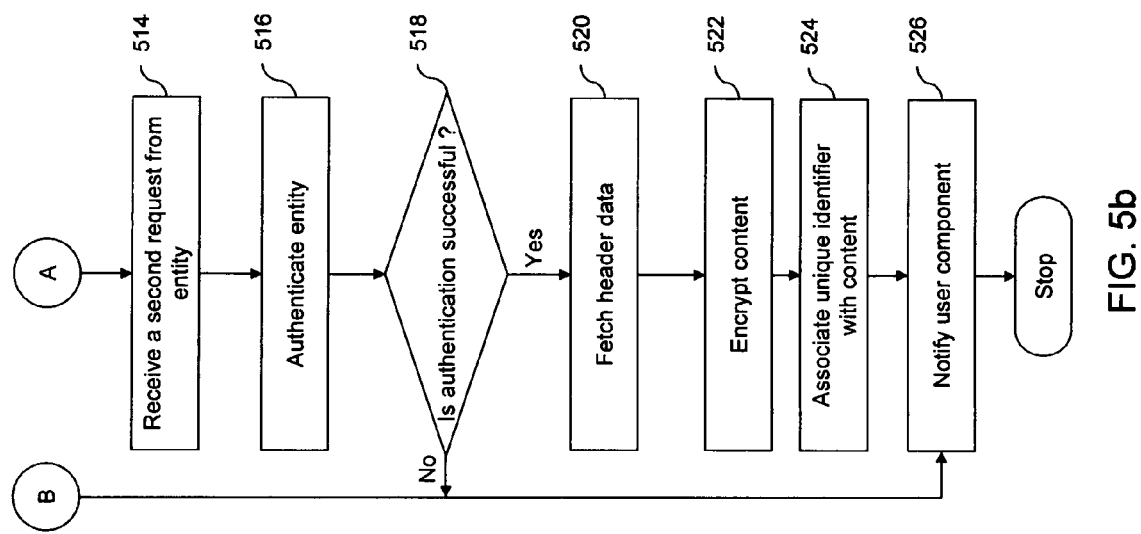

SYSTEM AND METHOD FOR SECURING AND TRACKING FILES

BACKGROUND

The present invention relates, in general, to the field of data security, and more specifically, to securing and tracking data in a Data Processing System (DPS).

One of the most valuable assets of an organization is its data. Data can be structured data or unstructured data. The structured data is the data stored in a database such as Oracle database. Examples of structured data can be employee name, address, salary information, and so forth. The unstructured data includes files stored in the hard drives of users or in a network. Examples of unstructured data include document files, such as Microsoft Word, Adobe PDF, Microsoft Excel, Google Spreadsheets, Microsoft PowerPoint, media files, source code files, and so forth.

With an increase in the number of employees working in the organization, preventing unauthorized access to unstructured data and structured data in a flat file format becomes a challenge. Moreover, the organization needs to prevent unauthorized use of the data by authenticated users. In order to address these challenges, various methods for data security exist.

One of the conventional methods for securing data involves making the data accessible only to authenticated users where a user's credentials are authenticated before providing access to the data. However, once authenticated, the user can execute undesirable operations on the data. Moreover, the operations executed on the data cannot be tracked.

Another conventional method for securing data involves restricting the operations that an authenticated user can execute on the data. These restrictions may comprise restricting the authenticated user to the following operations: copying the data, saving the data in a new file, and printing the data. However, these restrictions can decrease the efficiency of the authenticated user.

In light of the forgoing discussion, a need exists for a method and system for securing and tracking data. The method and system should provide access only to authenticated users. The method and system should also be capable of tracking any unauthorized operations executed on the data. Further, there is an ongoing need to reduce restrictions on authenticated users without compromising the security of the data. The present invention addresses such needs.

SUMMARY

An object of the present invention is to provide a method, system, and computer program product to secure restricted files.

Another object of the present invention is to track operations performed on the restricted files.

Yet another object of the present invention is to provide access to the restricted files only to authenticated users.

Still another object of the present invention is to reduce restrictions on authenticated users without compromising the security of the restricted files.

In order to achieve the foregoing objectives, and in accordance with the purpose of various embodiments of the present invention as broadly described herein, various embodiments of the present invention provide a method, system and computer program product for securing a restricted file in a Data Processing System (DPS). The restricted file is stored in an encrypted format in the DPS, which is connected to a server. A software application in the DPS sends a first request to execute a first set of operations on the restricted file. Thereafter, the software application is authenticated. If the authentication of the software is successful, the content of the restricted file is decrypted. Subsequently, the decrypted content is provided to the software application. The software application sends a second request to execute a second set of operations on the restricted file. Thereafter, the software application is authenticated again. If the authentication is successful, the software application can execute the second set of operations. However, the content of the restricted file is encrypted and saved in the memory of the DPS.

In accordance with an embodiment of the present invention, the system tracks the restricted file stored in the DPS. The system maintains a log of operations performed on the restricted file. Further, the system sends a record that includes the log and properties of the restricted file to the server.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which:

FIGS. 5a and 5b illustrate a flowchart of a method for securing the restricted file in the DPS in accordance with another embodiment of the present invention.

DETAILED DESCRIPTION OF THE INVENTION

Various embodiments of the present invention provide a method and system for securing and tracking restricted files stored in a Data Processing System (DPS). The DPS is connected to a server for sharing information. An entity requesting access to a restricted file is authenticated based on policies defined by a system administrator. Additionally, a log of operations executed on the restricted file is maintained by the system. Thereafter, the system sends a record of the log to the server.

Figure 1:
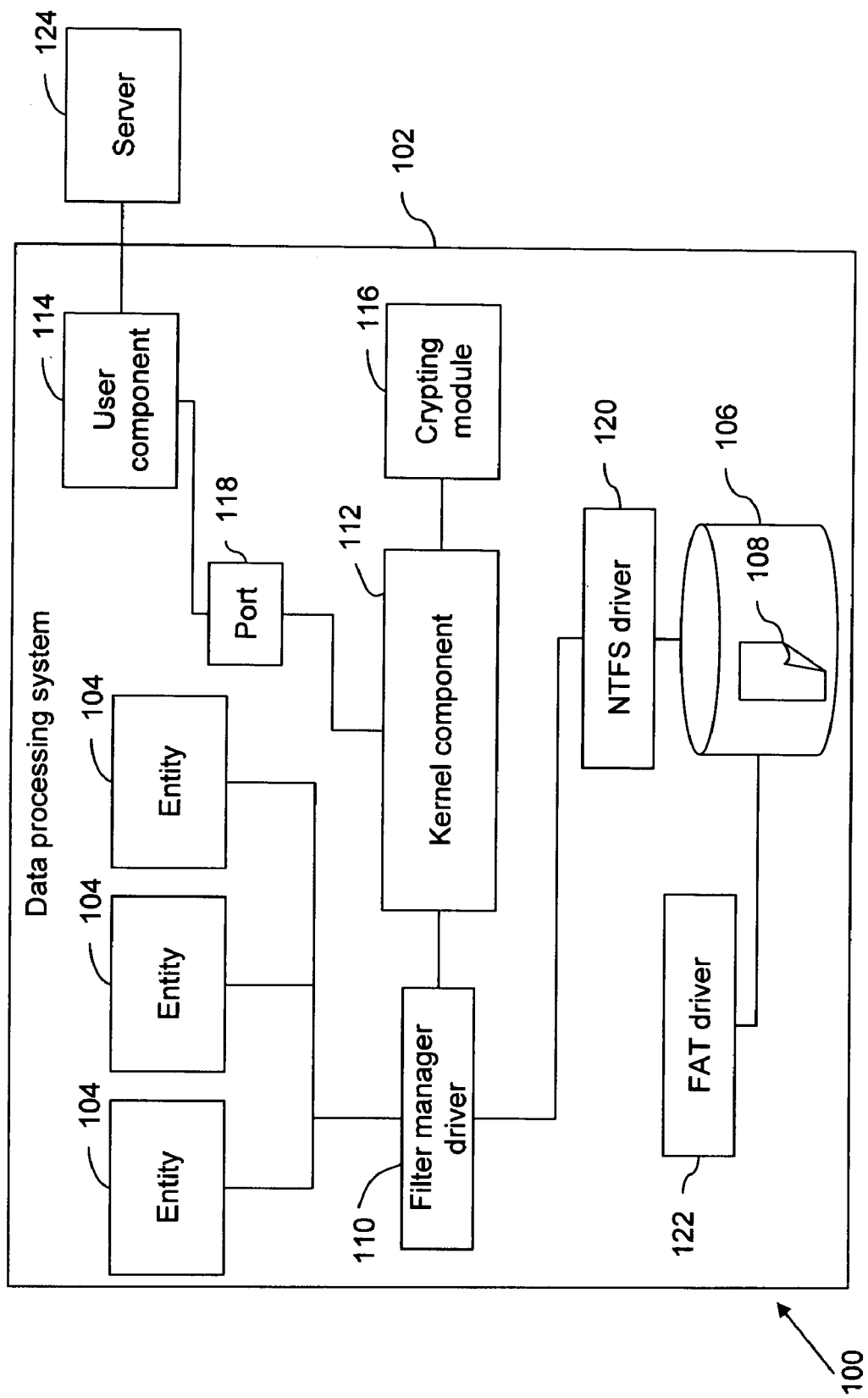
FIG. 1 illustrates an exemplary system in which the present invention can be practiced in accordance with various embodiments of the present invention.

FIG. 1 illustrates an exemplary system 100 in which the present invention can be practiced in accordance with various embodiments of the present invention. System 100 comprises a DPS 102 and a server 124. Examples of DPS 102 include, but are not limited to, a desktop computer, a laptop, and a Personal Digital Assistant (PDA). DPS 102 is connected to server 124 to share information. Server 124 is managed by a system administrator. In an embodiment of the present invention, DPS 102 can be connected to server 124 via a wired connection, a wireless connection, or a combination of both.

DPS 102 comprises one or more entities 104, which can be software applications. Examples of software applications include, but are not limited to, compilers, visual studio editors, Source Control Manager (SCM) plug-ins, and Integrated Drive Electronics interceptors.

Further, DPS 102 comprises a memory 106 and a restricted file 108, stored in memory 106. Examples of memory 106 include, but are not limited to, a hard drive, a Random Access Memory (RAM), a Read Only Memory (ROM), and a flash memory. Restricted file 108 is a file that an organization desires to protect from unauthorized access and operations. In an embodiment of the present invention, restricted file 108 is stored in memory 106 in an encrypted format. Each restricted file 108 has a unique identifier.

DPS 102 further comprises a filter manager driver 110, a kernel component 112, a user component 114, a crypting module 116, and a port 118. In an embodiment of the present invention, file manager driver 110 is a module that intercepts requests sent by entity 104 to a file system. Filter manager driver 110 is configured to receive a request from entity 104 and forward the request to kernel component 112. Kernel component 112 responds to the request after communicating with user component 114 through port 118. In an embodiment of the present invention, kernel component 112 and user component 114 are software modules. Crypting module 116 is configured to encrypt and decrypt restricted file 108. With reference to FIG. 1, crypting module 116 is plugged into kernel component 112. In another embodiment of the present invention, crypting module 116 is a part of kernel component 112. Further, crypting module 116 is a software module that can use a crypting algorithm such as Blowfish, and the like. In an embodiment of the present invention, port 118 is a virtual data connection used by user component 114 and kernel component 112 to exchange data directly.

In addition, DPS 102 comprises a New Technology File System (NTFS) driver 120 and a File Allocation Table (FAT) driver 122. NTFS is a standard file system of Microsoft Windows NT and its descendants, Windows 2000, Windows XP and so on. NTFS driver 120 is a software program that allows Linux software to access NTFS. Similarly, FAT driver 122 is a portable driver that is configured to access media formatted with the Microsoft FAT file system. FAT driver 122 provides services to read and write existing files, as well as to create and delete new files and directories. In an embodiment of the present invention, the system administrator defines policies pertaining to restricted file 108. These policies are stored in server 124. Further, the system administrator can change the policies stored in server 124.

In order to provide the above functions, user component 114 and kernel component 112 include various elements. Details of these elements have been provided in conjunction with FIGS. 2 and 3.

Figure 2:
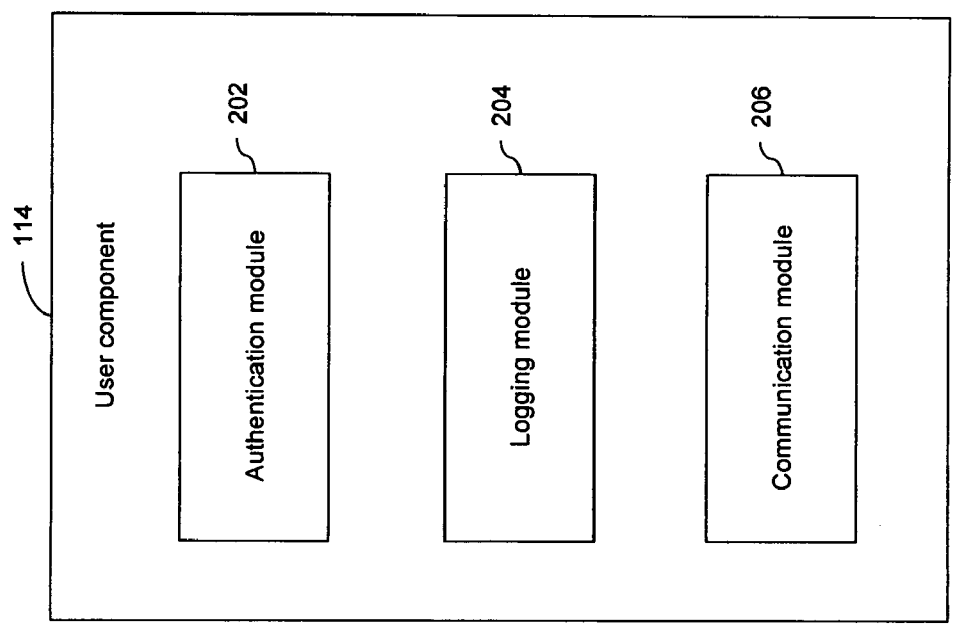
FIG. 2 is a block diagram illustrating various elements of a user component in accordance with various embodiments of the present invention.

FIG. 2 is a block diagram illustrating various elements of user component 114, in accordance with various embodiments of the present invention. User component 114 includes an authentication module 202, a logging module 204, and a communication module 206. In an embodiment of the present invention, user component 114 communicates with server 124 to receive policies after a predefined interval of time, as explained later in the invention. The predefined interval of time is set by the system administrator. In an embodiment of the present invention, authentication module 202 is configured to authenticate entity 104 when entity 104 attempts to execute an operation on restricted file 108. The authentication of entity 104 is based on the policies received by user component 114 from server 124. Logging module 204 maintains a log of operations performed on restricted file 108. Communication module 206 communicates with server 124 and kernel component 112. Further, communication module 206 communicates with server 124 to receive the policies. Furthermore, communication module 206 forwards the log maintained by logging module 204 to server 124. In an embodiment of the present invention, authentication module 202, logging module 204, and communication module 206 are software modules.

In an embodiment of the present invention, user component 114 communicates with server 124 for the first time when user component 114 starts bootstrapping. Bootstrapping is a process in which a module initiates for the first time. User component 114 sends a request to server 124 to receive the policies set by the system administrator. Server 124 sends the policies to user component 114. Thereafter, user component 114 gets updated policies from server 124 regularly after a predefined interval of time. The predefined interval of time starts from the moment when user component 114 is updated for the first time during bootstrapping. In an embodiment of the present invention, the policies can be in an XML format, as follows:

```
<?xml version="1.0"?>
<Company ID="1" Name="Persistent Systems Pvt. Ltd.">
    <Project ID="2" Name="SSI" DomainID="1" DomainName="India">
        <ConfigParams>
            <OfflineTimeout>1000</OfflineTimeout>
            <SynchTimeout>1000</SynchTimeout>
            <WhiteList>
                wordpad.exe;system.exe;explorer.exe;eclipse.exe;
                notepad.exe;xmlspy.exe;msdev.exe;devenv.exe;
            </WhiteList>
            <ZafeExtensions> cpp;tmp;java </ZafeExtensions>
            <ZafeLocations> \Zafe\investigations\test </ZafeLocations>
        </ConfigParams>
        <PolicyParams>
            <PrintAllowed>false</PrintAllowed>
            <CopyTextAllowed>true</CopyTextAllowed>
            <PasteTextAllowed>true</PasteTextAllowed>
            <SaveAllowed>true</SaveAllowed>
            <ScreenImageCaptureAllowed>true
            </ScreenImageCaptureAllowed>
        </PolicyParams>
        < User ID="1" FName="Narayan" LName="Nevrekar"
            LoginAccount="PERSISTENT\narayan">
        </User>
        <User ID="2" FName="Vishal" LName="Pai"
            LoginAccount="PERSISTENT\vishal_pai">
        </User>
    </Project>
</Company>
```

Figure 3:
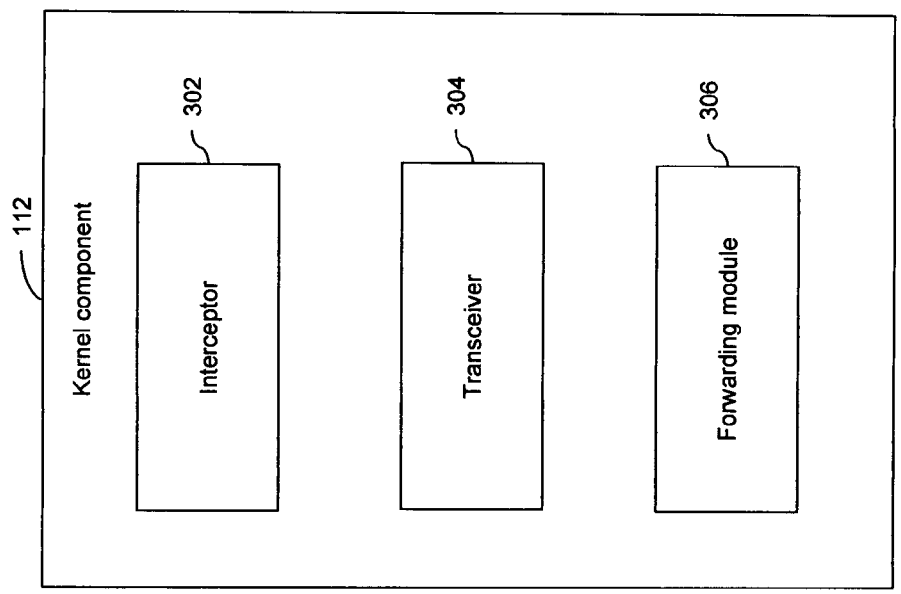
FIG. 3 is a block diagram illustrating various elements of a kernel component in accordance with various embodiments of the present invention.

FIG. 3 is a block diagram illustrating various elements of kernel component 112, in accordance with various embodiments of the present invention. Kernel component 112 includes an interceptor 302, a transceiver 304, and a forwarding module 306. In an embodiment of the present invention, interceptor 302 receives a request sent by entity 104 through filter manager driver 110. This request is sent to perform an operation on restricted file 108. Transceiver 304 is configured to communicate with user component 114 and entity 104. Forwarding module 306 sends the encrypted content received from crypting module 116 to entity 104. In an embodiment of the present invention, forwarding module 306, interceptor 302, and transceiver 304 are software modules.

Figure 4:
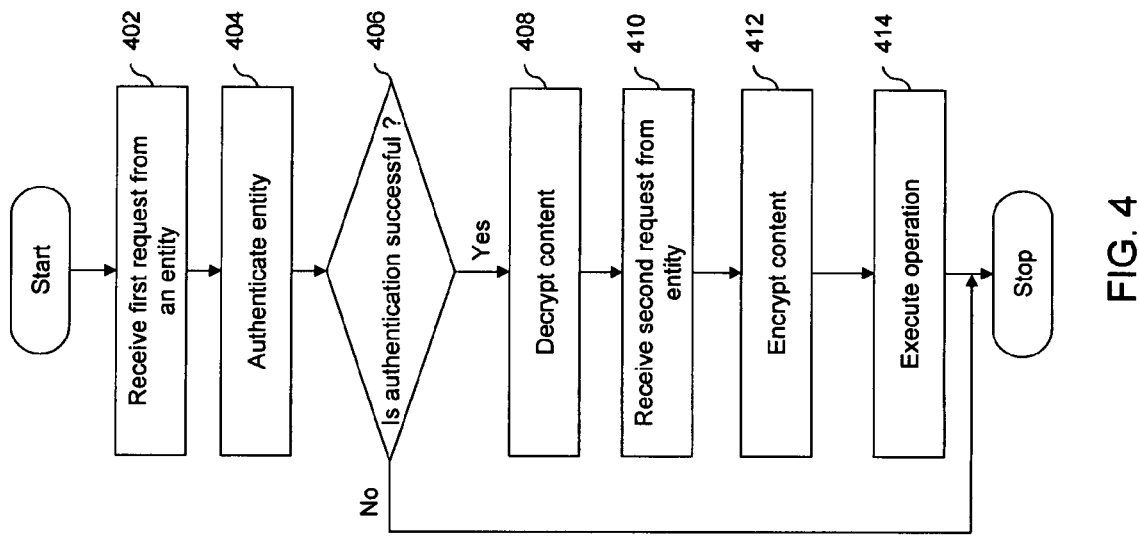
FIG. 4 illustrates a flow diagram of a method for securing a restricted file in a Data Processing System (DPS) in accordance with an embodiment of the present invention.

FIG. 4 illustrates a flow diagram of a method for securing restricted file 108 in DPS 102, in accordance with various embodiments of the present invention. Entity 104 sends a first request for executing a first set of operations on restricted file 108. Consider, for example, that the first set of operations includes opening and reading restricted file 108. At step 402, kernel component 112 receives the first request. Thereafter, kernel component 112 sends a request to user component 114, to authenticate entity 104. At step 404, entity 104 is authenticated. In an embodiment of the present invention, authentication module 202 authenticates entity 104. The authentication is based on a set of policies defined by a system administrator.

At step 406, it is verified whether the authentication is successful. In an embodiment of the present invention, this verification is performed by user component 114. If the authentication fails, the first set of operations are not performed on restricted file 108, and an error message is generated. If the authentication is successful, user component 114 communicates this to kernel component 112. Kernel component 112 sends a request to filter manager driver 110 to receive restricted file 108. Filter manager driver 110 retrieves restricted file 108 from memory 106 through NTFS driver 120. Thereafter, restricted file 108 is forwarded to kernel component 112, which sends restricted file 108 to crypting module 116. Subsequently, at step 408, the content of restricted file 108 is decrypted. In an embodiment of the present invention, the decryption is performed by crypting module 116. The decrypted content is forwarded to kernel component 112. Thereafter, forwarding module 306 sends the decrypted content to entity 104. In an embodiment of the present invention, forwarding module 306 sends the decrypted content to filter manager driver 110, which sends the decrypted content to entity 104.

At step 410, a second request from entity 104 is received by kernel component 112. The second request is received to execute at least one operation from a second set of operations on restricted file 108. In an embodiment of the present invention, the second set of operations includes writing on restricted file 108, copying the content of restricted file 108, saving restricted file 108 in a new location, and the like.

At step 412, the content of restricted file 108 is encrypted. In an embodiment of the present invention, the encryption process is performed by crypting module 116. At step 414, the at least one operation is executed on the encrypted content. The at least one operation can be, for example, storing the encrypted content in memory 106, for which the encrypted content is sent to memory 106 by NTFS driver 120. NTFS driver 120 receives the encrypted content from filter manager driver 110, which receives the encrypted content from crypting module 116. Thus, the file cannot be misused since only the encrypted version is available to the entity 104 to perform the second set of operations.

In an embodiment of the present invention, entity 104 sends a request to create a restricted file 108. This request is received by filter manager driver 110, which then sends the request to kernel component 112. Upon receipt of the request, kernel component 112 requests user component 114 to authenticate entity 104. In an embodiment of the present invention, the authentication is performed by authentication module 202. If the authentication fails, the request is not executed. If the authentication succeeds, user component 114 creates a unique ID for restricted file 108. Thereafter, a notice of the operation performed on restricted file 108 is sent to user component 114, which maintains a log of the operations performed on restricted file 108. User component 114 asynchronously sends a record to server 124. This record comprises the log and a set of properties associated with restricted file 108. In an embodiment of the present invention, the record comprises the following:
Restricted file name,
Restricted file header,
Organization name,
Domain name,
Server,
Project name,
Operation name,
Operation type,
Operation source,
Operation message,
Host name,
MAC address,
IP address, and
Date and time.

Figure 5A:
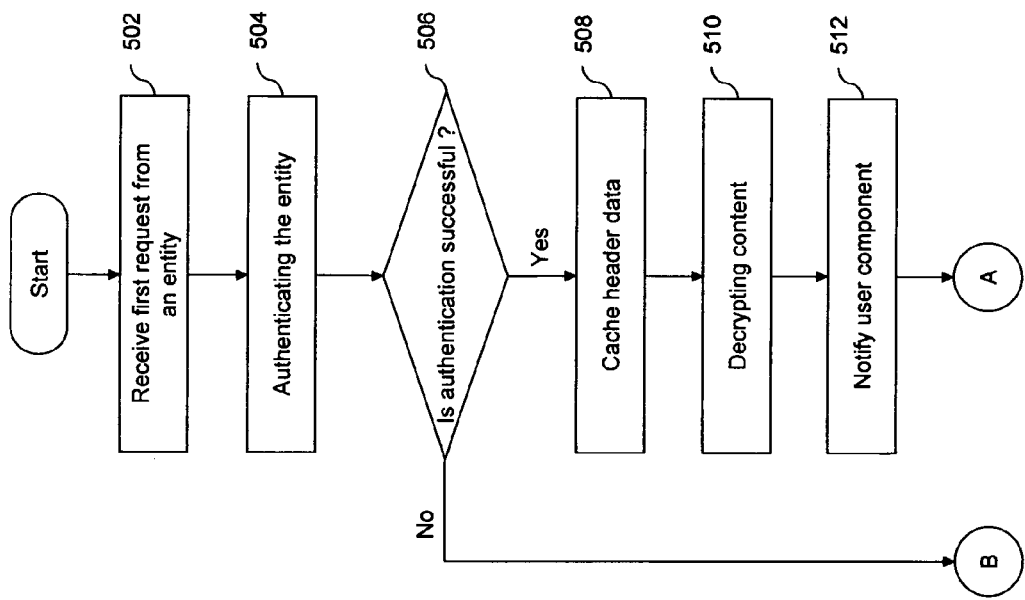

FIGS. 5*a* and 5*b* illustrate a flow diagram of a method for securing restricted file 108 in DPS 102, in accordance with various embodiments of the present invention. Entity 104 sends a first request for executing a first set of operations on restricted file 108. Consider, for example, that the first set of operations includes opening and reading restricted file 108. At step 502, kernel component 112 receives the first request. In an embodiment of the present invention, the first request is first received by filter manager driver 110, which forwards the first request to interceptor 302. Subsequently, interceptor 302 intercepts the first request and sends it to transceiver 304, which sends the first request to user component 114.

At step 504, entity 104 is authenticated. In an embodiment of the present invention, kernel component 112 sends a request to user component 114 for authenticating entity 104. The request comprises a process identifier associated with entity 104. User component 114 identifies entity 104 from the process identifier. Further, authentication module 202 performs the authentication of entity 104. The authentication is based on a set of policies received by user component 114 from server 124. The set of policies also includes a list of authorized entities. At step 506, it is verified whether the authentication is successful. If the authentication fails, an error message is generated and user component 114 is notified at step 526. If the authentication is successful, user component 114 sends a message pertaining to the successful authentication to kernel component 112. Thereafter, kernel component 112 sends a request to user component 114 to cache header data of restricted file 108. Subsequently, at step 508, user component 114 caches the header data. In an embodiment of the present invention, the header can be stored on server 124 or on DPU 102. Further, filter manager driver 110 sends a request to NTFS driver 120 to retrieve restricted file 108. In response, NTFS driver 120 retrieves restricted file 108 from memory 106 and provides restricted file 108 to filter manager driver 110. At step 510, the content of restricted file 108 is decrypted. In an embodiment of the present invention, the decryption is performed by crypting module 116. The decrypted content is sent to filter manager driver 110 by forwarding module 306. Thereafter, filter manager driver 110 forwards the decrypted content to entity 104, wherein the open and read operations are executed on the restricted file 108.

In an embodiment of the present invention, the header data is not decrypted by crypting module 116. This prevents any secure data stored in the header data from being interpreted by entity 104. After decrypting the content of restricted file 108, step 512 is performed. At step 512, user component 114 is notified about the successful execution of the first set of operations. Step 512 is performed by kernel component 112, in an embodiment of the present invention. Further, logging module 204 maintains a log pertaining to the operations performed on restricted file 108. In an embodiment of the present invention, the log is asynchronously forwarded to server 124.

At step 514, kernel component 112 receives a second request from entity 104 for executing at least one operation of a second set of operations on restricted file 108. The second set of operations can involve writing on restricted file 108, copying the content of restricted file 108, and saving restricted file 108 in a new location.

Consider, for example, that the second request pertains to writing on restricted file 108. In an embodiment of the present invention, filter manager driver 110 receives the second request, and forwards it to kernel component 112. Subsequently, kernel component 112 sends a request to user component 114 in order to authenticate entity 104 for the second request. In an embodiment of the present invention, the flow of the second request, via various components, is similar to the flow of the first set of requests. At step 516, entity 104 is authenticated to perform the second request. In an embodiment of the present invention, the authentication is performed by authentication module 202. In an embodiment of the present invention, the process of authentication is similar to the authentication process described at step 504. This authentication is based on the policies received by user component 114 from server 124. At step 518, the result of the authentication is verified. If the authentication process fails, an error message is generated, and user component 114 is notified at step 526. If the authentication is successful, step 520 is performed. At step 520, kernel component 112 receives the cached header from user component 114. At step 522, the content of restricted file 108 is encrypted. In an embodiment of the present invention, the process of encryption is performed by crypting module 116. Subsequently, a unique identifier is associated with the contents of restricted file 108 at step 524. In an embodiment of the present invention, the unique identifier is generated when restricted file 108 is created. In an embodiment of the present invention, the cached header data comprises the unique identifier of restricted file 108. The unique identifier is embedded into the encrypted content. The unique identifier facilitates in identifying and tracking all the operations performed on restricted file 108. In an embodiment of the present invention, the process of embedding is performed by kernel component 112. Further, the cached header and the encrypted content of restricted file 108 are stored in memory 106. At step 526, kernel component 112 communicates the writing operation performed on restricted file 108 to user component 114. Thus, the file 108 is protected since only the encrypted version is subject to the second operation.

In an embodiment of the present invention, the second request pertains to copying content of restricted file 108. Filter manager driver 110 receives the second request and sends the second request to kernel component 112. Kernel component 112 sends the second request to user component 114 to authenticate the second request. In an embodiment of the present invention, the flow of the second request, via various components, is similar to the flow of the first set of requests.

At step 516, entity 104 is authenticated. In an embodiment of the present invention, the authentication is performed by authentication module 202. This authentication is based on the policies received by user component 114 from server 124. Subsequently, the result of the authentication is verified at step 518. If the authentication process fails, an error message is generated and user component 114 is notified at step 526. If the authentication is successful, step 520 is performed. At step 520, kernel component 112 receives the cached header from user component 114. At step 522, the content of restricted file 108 is encrypted by crypting module 116 in an embodiment of the present invention. In an embodiment of the present invention, the encrypted content is copied in a clipboard. Subsequently, a unique identifier is associated with the contents of restricted file 108 at step 524. In an embodiment of the present invention, the unique identifier is generated when restricted file 108 is created. In an embodiment of the present invention, cached header data comprises the unique identifier of restricted file 108. The unique identifier is embedded into the encrypted content. In an embodiment of the present invention, embedding is performed by kernel component 112. Thereafter, kernel component 112 communicates the copying operation performed on restricted file 108 to user component 114 at step 526.

In yet another embodiment of the present invention, a second request to save restricted file 108 in a new location is received at step 514. In an embodiment of the present invention, filter manager driver 110 receives the second request. Subsequently, the second request is sent to kernel component 112 by file manager driver 110. Kernel component 112 sends a request to user component 112 to authenticate the second request. In an embodiment of the present invention, the flow of the second request, via various components, is similar to the flow of the first set of requests. At step 516, entity 104 is authenticated. In an embodiment of the present invention, the authentication process is performed by authentication module 202. This authentication is based on the policies that are received by user component 114 from server 124. Subsequently, the result of the authentication is verified at step 518. If the authentication process fails, an error message is generated and user component 114 is notified at step 526. If the process of authentication is successful, step 520 is performed. At step 520, kernel component 112 receives the cached header from user component 114. At step 522, the content of restricted file 108 is encrypted by crypting module 116. In an embodiment of the present invention, the encryption process is performed by crypting module 116. Subsequently, a unique identifier is associated with the contents of restricted file 108 at step 524. In an embodiment of the present invention, the unique identifier is generated when restricted file 108 is created. In an embodiment of the present invention, the cached header data comprises the unique identifier of restricted file 108. The unique identifier is embedded into the encrypted content. In an embodiment of the present invention, the process of embedding is performed by kernel component 112. At step 526, kernel component 112 communicates the information to user component 114 that restricted file 108 has been saved in the new location.

In yet another embodiment of the present invention, when the second request pertains to printing the content of restricted file 108, an open operation is performed on restricted file 108. Consequently, user component 114 creates a file object in a file collection associated with the project to which restricted file 108 belongs. Thereafter, a count of restricted files, which are open on DPU 102, is incremented by user component 114. If the count is greater than zero, the process of printing the content of restricted file 108 is disabled. In an embodiment of the present invention, any count greater than zero can be used to disable printing. If the policies are set to facilitate the process of printing restricted file 108, the process of printing the content of restricted file 108 is enabled.

In an embodiment of the present invention, user component 114 is configured to prevent a predefined set of restricted entities from writing on and reading restricted file 108. For example, software applications such as WinZip, explorer.exe, outlook.exe, internet explorere.exe, and so forth belong to the predefined set of restricted entities. Restricted entities can open a file but cannot read its contents. In an embodiment of the present invention, on receiving a request from the restricted entity, kernel component 112 sends the encrypted content of restricted file 108 to the restricted entity. Therefore, the restricted entity can view the encrypted content but can not read the decrypted contents of the restricted file.

In an embodiment of the present invention, the method described in FIG. 5 is performed for a limited period of time when user component 114 is disconnected from server 124. This limited period of time is defined by the system administrator. User component 114 maintains the record that has to be sent to server 124 in a queue. Thereafter, once the connection between user component 114 and server 124 is established, user component 114 sends the record to server 124.

Figure 6:
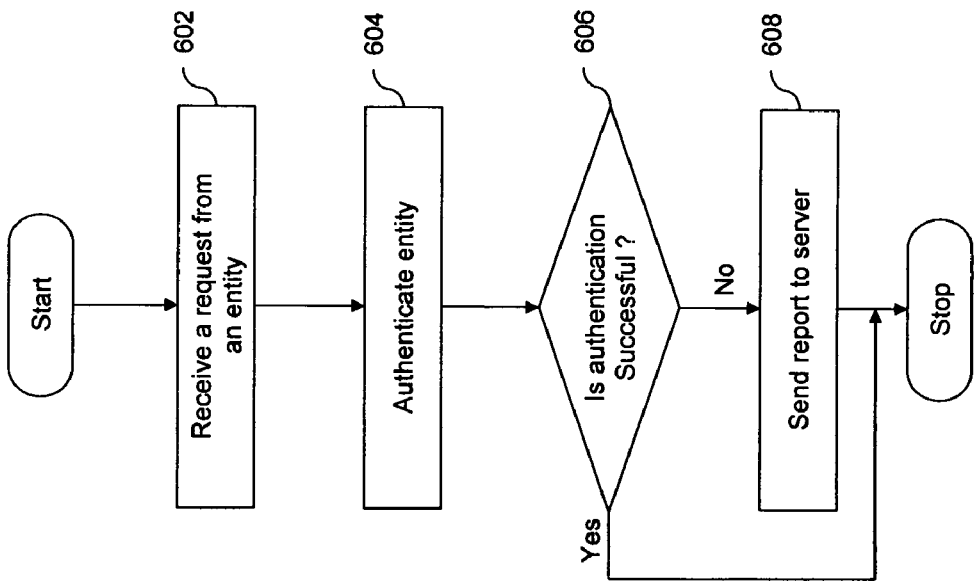
FIG. 6 illustrates a flow diagram of a method for tracking the restricted file in the DPS in accordance with various embodiments of the present invention.

FIG. 6 is a flow diagram illustrating a method for tracking restricted file 108 in DPS 102, in accordance with various embodiments of the present invention. At step 602, a request is received by kernel component 112. The request can pertain to the execution of at least one of the first and second sets of operations. In an embodiment, the request for performing the operation is sent by entity 104. Thereafter, the request is forwarded to user component 114. At step 604, authentication module 202 authenticates entity 104 to perform the operation. At step 606, the results of the authentication process are checked. If the authentication process is successful, the operation is executed and user component 114 is notified about the successful performance of the operation. If the process of authentication is not successful step 608 is performed. At step 608, a report is send to a server notifying the operation performed on restricted file 108. The report facilitates in tracking unauthorized operations performed on restricted file 108.

In an embodiment of the present invention, DPS 102 may not include user component 114, kernel component 112 and crypting module 116. In such cases, entity 104 sends a request to an open restricted file 108. When the restricted file 108 is opened, however, the encrypted content of restricted file 108 is not visible. In such a case, a link to server 124 is provided to a user of DPS 102. The user can use the link to download user component 114, kernel component 112 and crypting module 116 on DPS 102. After the process of downloading is completed, all the operations performed on restricted file 108 are notified to user component 114. User component 114 maintains a log pertaining to the operations performed on restricted file 108. User component 114 sends a record, comprising the log, to server 124 asynchronously.

In an embodiment of the present invention, a scheme of policies is provided in order to synchronize between user component 114 and server 124. In an embodiment of the present invention, the scheme has the following XML format:

```
<Project ID="2" Name="SSI" DomainID="1" DomainName="India">
    <ConfigParams>
        <OfflineTimeout>1000</OfflineTimeout>
        <SynchTimeout>1000</SynchTimeout>
        <WhiteList>
           wordpad.exe;system.exe;explorer.exe;eclipse.exe;
           notepad.exe;xmlspy.exe;msdev.exe;devenv.exe;
        </WhiteList>
        <ZafeExtensions> cpp;tmp;java </ZafeExtensions>
        <ZafeLocations> \Zafe\investigations\test </ZafeLocations>
    </ConfigParams>
    <PolicyParams>
        <PrintAllowed>false</PrintAllowed>
        <CopyTextAllowed>true</CopyTextAllowed>
        <PasteTextAllowed>true</PasteTextAllowed>
        <SaveAllowed>true</SaveAllowed>
        <ScreenImageCaptureAllowed>true
        </ScreenImageCaptureAllowed>
    </PolicyParams>
    <User ID="1" FName="Narayan" LName="Nevrekar"
        LoginAccount="PERSISTENT\narayan">
```

-continued

```
    </User>
    <User ID="2" FName="Vishal" LName="Pai"
        LoginAccount="PERSISTENT\vishal_pai">
    </User>
</Project>
```

In an embodiment of the present invention, user component 114 is disconnected from server 124. In this event, information to be sent to server 124 is logged up in a queue. Thereafter, the information is sent to server 124, after user component 114 and server 124 are connected. In an embodiment of the present invention, the information sent to server 124 has the following XML format

```
<?xml version=\"1.0\"?>
<NotificationPacket>
    <Notify>
        <EventName> EventName</EventName>
        <EventType>EventType</EventType>
        <EventSource>EventSource</EventSource>
        <FileName>FileName</FileName>
        <EventMessage>EventMessage</EventMessage>
        <FileHeader>
            <Header>
                <FileID>1</FileID>
                <Organization>NA</Organization>
                <Project>NA</Project>
                <Domain>NA</Domain>
                <HostName>HostName1</HostName>
                <IPAddress>IPAddress1</IPAddress>
                <MAC_Addr>MacAddress1</MAC_Addr>
                <CorporateServer>NA</CorporateServer>
                <ZafeServer>NA</ZafeServer>
            </Header>
        </FileHeader>
        <DateTime>DateTime</DateTime>
    </Notify>
<NotificationPacket>
```

In an embodiment of the present invention, kernel component 112 uses a command to authorize a request made by entity 104 to user component 114. User component 114 authorizes the request after performing a series of checks. If all of the checks are successful, user component 114 returns 'TRUE'; otherwise, it returns 'FALSE'. In an embodiment of the present invention, user component 114 performs the following checks:

Validating file extension against file extensions supported by user component 114

Validating the file location against user component 114 supported file locations Checking whether entity 104 has any file-access policies denied Checking whether entity 104 accessing the file belongs to a user component 114 accepted entity list Checking whether there is a timeout for offline access In an embodiment of the present invention, the command input by kernel component 112 and the output sent by user component 114 is as follows:

Input

Authorize Command

Authorize|Operation=Open|ProcID=5609|FileName=C: \projectx\com\zafesoft\bus\file_0.java In addition to 'open', other operations possible are File-Print, ClipCopy, ClipPaste, Save.

Output

STATUS_NON_ZAFE_FILE="1"

STATUS_ZAFE_FILE="2"

STATUS_FORCED_ZAFE_FILE="3"
STATUS_USER_ACCESS_DENIED="−1"
STATUS_NON_WHITE_LIST="−2"
STATUS_OFFLINE_TIMEOUT_EXPIRED="−3"
STATUS_SCM_PROCESS="4"

In an embodiment of the present invention, a command is issued by kernel component 112 to notify user component 114 about operations performed on restricted file 108. In this case, the command input by kernel component 112 and the output sent by user component 114 is as follows:

Input
    Notify|EventName=FileOpen
        |EventType=Warning
        |EventSource=VS-2003 Editor Plugin
        |FileName=z:\Zafe\ZafeOpener\ZafeOpener.cpp
        |EventMessage=File Content Copied
        |ProcID=5609
Output The return value of this command from the user component 114 service will be "0", if the user component 114 successfully registers the event.

In an embodiment of the present invention, a command is issued by kernel component 112 to obtain the header data of restricted file 108 from user component 114. The header is embedded by kernel component 112 in restricted file 108. In an embodiment of the present invention, the command supports two modes, the first mode being an 'Exist' mode and the second mode being a 'New' mode. In the Exist mode, user component 114 obtains the header from the cache. In the case of the new mode, user component 114 constructs a new header, adds it to the cache, and returns the header to kernel component 112. In this case, the command input by kernel component 112 and the output sent by user component 114 is as follows:

Input
GetFileHeader|FileName=z:
\Zafe\ZafeOpener\ZafeOpener.cpp
Output

The return value of this command from user component 114 is the following XML:

<Header>
        <FileID>{194CE75E-CA9F-4ab5-B31F-
            017ECEDAF402}</FileID>
        <Organization>Persistent Systems Pvt. Ltd. </Organiza-
            tion>
        <Project>Zafe </Project>
        <Domain>India </Domain>
        <UserName>persistent\narayan </UserName>
        <MachineName>karwar.persitent.co.in    </Machine-
            Name>
        <MachineIP>10.77.202.238</MachineIP>
        <MAC_Addr>00-0E-7F-A4-22-37 </MAC_Addr>
        <CorporateServer>PSPL_ZAFE </CorporateServer>
        <ZafeServer>ZafeSoft </ZafeServer>
    </Header>

In an embodiment of the present invention, a command is sent by a plugin to the user component 114 when an editor is opened. The editor may be a third party component that enables editing of restricted file 108. Examples of the editor include Eclipse, Visual Studio, Emacs, and so forth. The command notifies the user component 114 that zafe-plugin is enabled in the editor. In an embodiment of the invention, zafe-plugin is a Zafesoft proprietary software code installed in the editor.

Input
RegisterPlugin\ProcID=5609
Output

"0": if the user component 114 is able to register the plugin successfully

In an embodiment of the present invention, a command is used by kernel component 112 to set restricted file 108 header information into the cache of user component 114. Kernel component 112 needs to preserve the header of restricted file 108 in the cache, thereby protecting restricted file 108 from scenarios where the content of restricted file 108 is initially saved in a temporary file and then renamed in its original filename. In such a case, the command input by kernel component 112 and the output sent by user component 114 is as follows:

Input
    |FileName=z:\Zafe\ZafeOpener\ZafeOpener.cpp
    |FileHeader=<Header> . . . </Header>
Output The return value of this command from user component 114 is "0" if restricted file 108 belongs to a project and the header is successfully set and "1" if restricted file 108 does not belong to a project.

In an embodiment of the present invention, a command is sent by the plugin to user component 114 when the editor is closed.

Input
UnregisterPlugin|ProcID=5609
Output

"0": if the user component 114 is able to unregister the plugin successfully.

A command is used by entity 104 to communicate the opening of restricted file 108. In an embodiment of the present invention, entity 104 is an IDE plug-in. IDE is an Integrated Development Environment such as Eclipse. User component 114 creates a file object, if it has not already been created in a file collection associated with the project. User component 114 increments the active file count, which denotes the number of restricted files that are open on DPS 102. If this count is greater than zero, the printing process is disabled. Kernel component 112 also increments the reference count of restricted file 108 in the file object.

Input
FileOpen|FileName=C:\projectx\com\zafesoft\bus\file_
0.java
Output

"0", if the user component 114 is able to successfully register the opening of the file, "−1" otherwise, For example incase restricted file 108 path is invalid.

A command is used by entity 104 to communicate information pertaining to the closing of restricted file 108. In an embodiment of the present invention, entity 104 is an IDE plug-in. This command is used by the IDE plug-in to communicate the closing operation of the IDE. User component 114 decrements the reference count of the file stored in the file object. If this count becomes zero, user component 114 removes the file object from the file collection associated with the project, thereby decrementing the active file count. If this count becomes zero, the printing process is enabled.

Input
FileClose|FileName=C:\projectx\com\zafesoftlbus\file_
0.java
Output

The return value of this command from user component 114 is "0", if the user component 114 is able to successfully register the closing of the file. "−1" otherwise, e.g., restricted file 108 path is invalid.

A command is used by entity 104 to communicate the pasting of content of restricted file 108. In an embodiment of the present invention, entity 104 is an IDE plug-in. User component 114 sets a flag in the file object associated with restricted file 108, thereby incrementing the active file count. If this count is greater than zero, the printing process is disabled.

Input

ForceZafe|FileName="z:\Zafe\ZafeOpener\ZafeOpener.cpp"

Output

The return value of this command from user component 114 is "0", if the user component 114 is able to mark restricted file 108 as ForceZafe. "−1": otherwise, e.g., restricted file 108 path is invalid.

A command is used by entity 104 to obtain a communication port for creating a socket through which communication with user component 114 takes place. In an embodiment of the present invention, entity 104 is an IDE plug-in. User component 114 finds a socket port on the machine and creates a socket by using its port number. User component 114 also creates a thread, which serves commands from this socket.

Input

GetCommunicationPort

Output

The return value of this command from user component 114 is its socket port number on which communication between user component 114 and kernel component 112 will interact.

In an embodiment of the present invention, user component 114 uses an Application Programming Interface (API) to receive policies from server 124. The API returns the policies to user component 114. In an embodiment of the present invention, the policies have the following XML format:

```xml
<?xml version="1.0"?>
<Company ID="1" Name="Persistent Systems Pvt. Ltd.">
    <Project ID="2" Name="SSI" DomainID="1" DomainName="India">
        <ConfigParams>
            <OfflineTimeout>1000</OfflineTimeout>
            <SynchTimeout>1000</SynchTimeout>
            <WhiteList>
                wordpad.exe;system.exe;explorer.exe;eclipse.exe;
                notepad.exe;xmlspy.exe;msdev.exe;devenv.exe;
            </WhiteList>
            <ZafeExtensions> cpp;tmp;java </ZafeExtensions>
            <ZafeLocations> \Zafe\investigations\test </ZafeLocations>
        </ConfigParams>
        <PolicyParams>
            <PrintAllowed>false</PrintAllowed>
            <CopyTextAllowed>true</CopyTextAllowed>
            <PasteTextAllowed>true</PasteTextAllowed>
            <SaveAllowed>true</SaveAllowed>
            <ScreenImageCaptureAllowed>true
            </ScreenImageCaptureAllowed>
        </PolicyParams>
        < User ID="1" FName="Narayan" LName="Nevrekar"
            LoginAccount="PERSISTENT\narayan">
        </User>
        <User ID="2" FName="Vishal" LName="Pai"
            LoginAccount="PERSISTENT\vishal_pai">
        </User>
    </Project>
</Company>
```

In an embodiment of the present invention, an API is called by user component 114 to receive an update on the policy relating to a project from server 124. Whenever a predefined time lapses, user component 114 calls this API. Thereafter, user component 114 communicates the time at which the policies relating to each project were last modified. This time is communicated at the previous call. Thereafter, server 124, on receiving the call, compares the time at which the call was received with the actual value of the database relating to every project. If there is any change, server 124 returns all the policies pertaining to a particular project to user component 114. In this case, the output from the API has the following XML format:

```xml
<?xml version="1.0"?>
<Company ID="1" Name="Persistent Systems Pvt. Ltd.">
    <Project ID="2" Name="SSI" DomainID="1" DomainName="India"
        Result="Project_Changed">
        <ConfigParams>
            <OfflineTimeout>1000</OfflineTimeout>
            <SynchTimeout>1000</SynchTimeout>
            <WhiteList>
                wordpad.exe;system.exe;explorer.exe;eclipse.exe;
                notepad.exe;xmlspy.exe;msdev.exe;devenv.exe
            </WhiteList>
            <ZafeExtensions> cpp;tmp;java </ZafeExtensions>
            <ZafeLocations> \Zafe\investigations\test </ZafeLocations>
        </ConfigParams>
        <PolicyParams>
            <PrintAllowed>false</PrintAllowed>
            <CopyTextAllowed>true</CopyTextAllowed>
            <SaveAllowed>true</SaveAllowed>
            <PasteTextAllowed>true</PasteTextAllowed>
            <ScreenImageCaptureAllowed>true
            </ScreenImageCaptureAllowed>
        </PolicyParams>
        <User ID="1" FName="Narayan" LName="Nevrekar"
            LoginAccount="PERSISTENT\narayan">
        </User>
        <User ID="2" FName="Vishal" LName="Pai"
            LoginAccount="PERSISTENT\vishal_pai">
        </User>
    </Project>
</Company>
```

In an embodiment of the present invention, an API is called by user component 114 to obtain a list of projects pertaining to a user of DPS 102. In such a case, the output from the API has the following XML format:

```xml
<?xml version="1.0"?>
<Company ID="1" Name="Persistent Systems Pvt. Ltd.">
    <Project ID="2" Name="SSI" DomainID="1" DomainName="India"/>
</Company>
```

In an embodiment of the present invention, an API is called by user component 114 to check if server 124 is running and reachable. The API returns 'true value', if server 124 is reachable.

Various embodiments of the present invention provide a method and system in which access to a restricted file is only provided to an authenticated entity. When an entity attempts to access the restricted file, the entity is authenticated by a user component. Access to the restricted file is provided only if the authentication is successful.

In accordance with various embodiments of the present invention, an authenticated entity can execute only authorized operations on the restricted file. Each time an entity attempts to perform an operation on the restricted file, the entity is authenticated with respect to that operation. The entity is allowed to perform the operation only upon successful authentication.

Various embodiments of the present invention provide secure access to a restricted file, without imposing unnecessary restrictions on an entity. Upon authentication, the entity is allowed to perform a certain set of operations on the restricted file. This is achieved by encrypting and decrypting the content of the restricted file, as required, even when the entity is authenticated.

Furthermore, the user component maintains a log of operations performed on a restricted file, thereby keeping a track of the performed operations. The user component sends a record, which includes the log, to a server.

The method and system, as described in the present invention or any of its components, may be embodied in the form of a data processing system. Typical examples of a data processing system include a general-purpose computer, a programmed microprocessor, a micro-controller, a peripheral integrated circuit element, and other devices or arrangements of devices that are capable of implementing the acts constituting the method of the present invention.

The data processing system comprises a computer, an input device, a display unit, the Internet, and a microprocessor. The microprocessor is connected to a communication bus. The computer also comprises a memory, which may include Random Access Memory (RAM) and Read Only Memory (ROM). The data processing system also comprises a storage device, which can be a hard disk drive or a removable storage drive such as a floppy disk drive, optical disk drive, and so forth. The storage device can also be other similar means for loading computer programs or other instructions into the computer system.

The data processing system executes computer-readable program code that is stored in one or more storage elements, in order to process input data. These storage elements may also hold data or other information, as desired, and may also be in the form of an information source or a physical memory element in the processing machine.

The computer-readable program code may include various commands instructing the processing machine to perform specific tasks such as the acts constituting the method of the present invention. The computer-readable program code may be in the form of a software program, and the software may be in various forms, such as system software or application software. Further, the software may be in the form of a collection of separate programs, a program module with a larger program, or a portion of a program module. The software may also include modular programming in the form of object-oriented programming. The processing of input data by the processing machine may be in response to user commands, to results of previous processing, or in response to a request made by another processing machine.

While embodiments of the present invention have been illustrated and described, it will be clear that the present invention is not limited to these embodiments only. Numerous modifications, changes, variations, substitutions and equivalents will be apparent to those skilled in the art, without departing from the spirit and scope of the present invention, as described in the claims.

What is claimed is:

1. A method for securing content present in a restricted file in a data processing system, wherein the data processing system is connected to a server, the restricted file being stored locally in the data processing system in an encrypted format, the method comprising the steps of:

receiving a first request from an entity for executing at least one operation from a first set of operations on the content of the restricted file, the entity being a software application, each restricted file having a unique identifier and the content of the restricted file being pre-associated with the corresponding unique identifier;

authenticating the entity at the data processing system for executing at least one operation from the first set of operations on the content of the restricted file, the authentication being performed based on predefined policies, wherein the predefined policies are stored at the server;

caching a header data of the restricted file, wherein the caching comprises receiving the restricted file and saving the header data, and wherein the header data comprises the unique identifier of the restricted file;

decrypting the content of the restricted file except the header data if the authentication is successful, wherein decrypting the content except the header data facilitates providing permission for executing the at least one operation from the first set of operations and prevents any secure data stored in the header data from being interpreted by the entity;

receiving a second request from the entity for executing at least one operation from a second set of operations on the content of the restricted file;

authenticating the entity at the data processing system for executing the at least one operation from the second set of operations;

extracting the unique identifier from the cached header data;

encrypting the content of the restricted file subsequent to authenticating the entity sending the second request, wherein the encrypting further comprises embedding the unique identifier into the encrypted content; and executing the at least one operation of the second set of operations on the encrypted content, the execution of the at least one operation on the encrypted content protecting the restricted file from being misused, whereby the restricted file is under a control of the data processing system, wherein each of the first set of operations and the second set of operations are tracked using the unique identifier, wherein the above steps are performed by a microprocessor, the microprocessor being included in the data processing system.

2. The method according to claim 1, further comprising sending the encrypted content of the restricted file to the entity without performing decryption of the content of the restricted file, if the entity belongs to a predefined set of restricted entities.

3. The method according to claim 1, wherein the first set of operations comprises opening and reading the content of the restricted file.

4. The method according to claim 1, wherein the second set of operations comprises at least one of: copying the content of the restricted file, modifying the content of the restricted file, saving the restricted file, saving the restricted file as a new file, and printing the content of the restricted file.

5. The method according to claim 1 further comprising maintaining a log of one or more operations from the first set of operations and the second set of operations executed on the content of the restricted file.

6. The method according to claim 5 further comprising sending a record to the server, wherein the record comprises the log and a set of properties associated with the content of the restricted file.

7. The method according to claim 6, wherein the set of properties comprises at least one of: a name of the restricted file, a header of the restricted file, an organization name, a domain name, the server address, a project name, a operation source, a operation message, a Media Access Control (MAC) address, a host name, a date and time, and an Internet Protocol (IP) address.

8. The method according to claim 1, wherein the predefined policies are updated after predefined intervals of time.

9. The method according to claim 1 wherein the header data of the restricted file is cached in a memory in the data processing system.

10. The method according to claim 1 further comprising executing the steps of claim 1 for a limited period of time when the data processing system and the server are disconnected.

11. A storage element for use with a computer, the storage element having a computer-readable program code embodied therein for securing content of a restricted file in a data processing system, wherein the data processing system is connected to a server, the restricted file being stored locally in an encrypted format, the computer-readable program code comprising:
- instructions for receiving a first request from an entity for executing at least one operation from a first set of operations on the content of the restricted file, the entity being a software application, each restricted file having a unique identifier and the content of the restricted file being pre-associated with the corresponding unique identifier;
- instructions for authenticating the entity for executing at least one operation from the first set of operations on the content of the restricted file, the authentication being performed based on predefined policies, the predefined policies being stored at the server;
- instructions for caching header data of the restricted file, wherein the caching comprises receiving the restricted file and saving the header data, and wherein the header data comprises the unique identifier of the restricted file;
- instructions for decrypting the content of the restricted file except the header data, if the authentication is successful, wherein decrypting the content except the header data facilitates providing permission for executing the at least one operation from the first set of operations and prevents any secure data stored in the header data from being interpreted by the entity;
- instructions for receiving a second request from the entity for executing at least one operation from a second set of operations on the content of the restricted file;
- instructions for authenticating the entity for executing the at least one operation from the second set of operations;
- instructions for extracting the unique identifier from the cached header data;
- instructions for encrypting the content of the restricted file subsequent to authenticating the entity sending the second request, wherein the encrypting further comprises embedding the unique identifier into the encrypted content; and
- instructions for executing the at least one operation of the second set of operations on the encrypted content, the execution of the at least one operation on the encrypted content protecting the restricted file from being misused, wherein the restricted file is under a control of the data processing system, wherein each of the first set of operations and the second set of operations are tracked using the unique identifier.

12. The storage element according to claim 11, wherein the computer-readable program code comprises instructions for maintaining a log of the first set of operations and the second set of operations executed on the content of the restricted file.

13. The storage element according to claim 11, wherein the computer-readable program code comprises instructions for receiving updated predefined policies from the server after a predefined interval of time.

* * * * *